(12) United States Patent
Kanda (10) Patent No.: US 12,254,654 B2
(45) Date of Patent: Mar. 18, 2025

(54) MICROSTRUCTURAL IMAGE ANALYSIS DEVICE AND MICROSTRUCTURAL IMAGE ANALYSIS METHOD

(71) Applicant: Hitachi, Ltd., Tokyo (JP)

(72) Inventor: Takayuki Kanda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 437 days.

(21) Appl. No.: 17/574,635

(22) Filed: Jan. 13, 2022

(65) Prior Publication Data
US 2022/0262040 A1    Aug. 18, 2022

(30) Foreign Application Priority Data
Feb. 16, 2021    (JP) ................. 2021-022455

(51) Int. Cl.
*G06T 3/40* (2024.01)
*G06T 7/00* (2017.01)
*G06T 7/11* (2017.01)
*G06T 7/136* (2017.01)
*G06T 11/20* (2006.01)

(52) U.S. Cl.
CPC ............. *G06T 7/97* (2017.01); *G06T 3/40* (2013.01); *G06T 7/11* (2017.01); *G06T 7/136* (2017.01); *G06T 11/206* (2013.01); *G06T 2207/10056* (2013.01)

(58) Field of Classification Search
CPC ... G06T 7/97; G06T 7/136; G06T 7/11; G06T 3/40; G06T 11/206; G06T 2207/10056
See application file for complete search history.

(56) References Cited

U.S. PATENT DOCUMENTS

| | | | | |
|---|---|---|---|---|
| 10,475,183 B2 * | 11/2019 | Kawaguchi | ............... | G06T 1/00 |
| 11,321,841 B2 * | 5/2022 | Nakane | ................... | G06T 7/136 |
| 11,515,004 B2 * | 11/2022 | Rietman | ................ | G16B 45/00 |
| 2002/0186875 A1 * | 12/2002 | Burmer | ................ | G06V 30/194 |
| | | | | 382/133 |
| 2018/0204324 A1 * | 7/2018 | Kawaguchi | ............ | G01N 33/48 |
| 2023/0215010 A1 * | 7/2023 | Soma | ....................... | G06T 11/40 |

FOREIGN PATENT DOCUMENTS

| | | | | |
|---|---|---|---|---|
| JP | 6483826 B2 | 3/2019 | | |
| WO | WO-2017010397 A1 * | 1/2017 | ............. | G01N 21/17 |
| WO | WO-2021133847 A1 * | 7/2021 | ....... | G06F 18/24137 |
| WO | WO-2021261323 A1 * | 12/2021 | ........... | G06T 11/203 |

* cited by examiner

*Primary Examiner* — Shefali D Goradia
(74) *Attorney, Agent, or Firm* — MATTINGLY & MALUR, PC (57) ABSTRACT

The invention is to provide a microstructural image analysis device and a microstructural image analysis method capable of quantifying the relations in a plurality of regions included in a microstructural image. There is provided a microstructural image analysis device for analyzing a microstructural image. The microstructural image analysis device includes a region processing unit that extracts a first region and a second region from the microstructural image and expands the first region and the second region, an overlapping region extraction unit that extracts an overlapping region of both the first region and the second region each time the first region and the second region are expanded, and a persistence diagram generation unit that generates a persistence diagram based on a hole region generated and eliminated due to the overlapping region.

8 Claims, 8 Drawing Sheets

| | BINARIZED IMAGES OF FIRST REGION (FIRST IMAGE) | BINARIZED IMAGES OF SECOND REGION (SECOND IMAGE) | EXTRACT OVERLAPPING REGIONS (S303) |
|---|---|---|---|
| EXTRACT EACH REGION (S302) | | | |
| FIRST EXPANSION OF EACH REGION (S306) | | | |
| FIFTH EXPANSION OF EACH REGION (S306) | | | |
| TENTH EXPANSION OF EACH REGION (S306) | | | |
| ⋮ | ⋮ | ⋮ | ⋮ |

FIG. 7

MICROSTRUCTURAL IMAGE ANALYSIS DEVICE AND MICROSTRUCTURAL IMAGE ANALYSIS METHOD

The present application claims priority from Japanese Patent Application JP 2021-022455 filed on Feb. 16, 2021, the content of which is hereby incorporated by reference into this application.

BACKGROUND OF THE INVENTION

1. Field of the Invention

The present invention relates to a microstructural image analysis device and a microstructural image analysis method for analyzing a microstructural image.

2. Description of the Related Art

Japanese Patent No. 6483826 (Patent Literature 1) discloses that in order to determine a configuration of a microstructural image obtaining by capturing an image of a microstructure, information depending on a feature number which characterizes a correlation between a reference value and the number of hole regions calculated for each binarized image generated by binarizing the microstructural image with a different reference value is output.

However, Patent Literature 1 does not give consideration to quantifying relations in a plurality of regions included in the microstructural image, for example, a relation between individual phases included in an electron microscope image of an alloy, and only analyzes each of the regions.

SUMMARY OF THE INVENTION

Therefore, an object of the invention is to provide a microstructural image analysis device and a microstructural image analysis method capable of quantifying the relations in a plurality of regions included in a microstructural image.

In order to achieve the above object, the invention provides a microstructural image analysis device for analyzing a microstructural image. The microstructural image analysis device includes a region processing unit that extracts a first region and a second region from the microstructural image and expands the first region and the second region, an overlapping region extraction unit that extracts an overlapping region of both the first region and the second region each time the first region and the second region are expanded, and a persistence diagram generation unit that generates a persistence diagram based on a hole region generated and eliminated due to the overlapping region.

The invention also relates to a microstructural image analysis method for analyzing a microstructural image. The microstructural image analysis method includes a region processing step of extracting a first region and a second region from the microstructural image and expanding the first region and the second region, an overlapping region extraction step of extracting an overlapping region of both the first region and the second region each time the first region and the second region are expanded, and a persistence diagram generation step of generating a persistence diagram based on a hole region generated and eliminated due to the overlapping region.

According to the invention, it is possible to provide the microstructural image analysis device and the microstructural image analysis method capable of quantifying the relations in a plurality of regions included in a microstructural image.

DESCRIPTION OF THE PREFERRED EMBODIMENTS

Hereinafter, embodiments of a microstructural image analysis device and a microstructural image analysis method according to the invention will be described with reference to the drawings. The invention should not be construed as being limited to the description of the embodiments described below. Those skilled in the art could easily understand that the specific configuration of the invention can be changed without departing from a spirit or a gist of the invention.

In configurations of the invention described below, the same reference numerals may be used in common among different drawings for the same parts or parts having similar functions, and duplicate description may be omitted. When there is a plurality of elements having the same or similar functions, different subscripts may be given to the same reference sign for description. However, when it is unnecessary to distinguish the plurality of elements, the subscripts may be omitted for description.

The terms "first", "second", "third", and the like in the present specification are used to identify components, and do not necessarily limit the number, orders, or contents thereof. Further, the numbers for identifying the components are used in each context, and the numbers used in one context do not always indicate the same configuration in other contexts. Further, it does not prevent the component identified by a certain number from having the function of a component identified by another number.

In order to facilitate understanding of the invention, a position, a size, a shape, a range, and the like of each component shown in the drawings may not represent an actual position, size, shape, range, and the like. Therefore, the invention is not necessarily limited to the position, size, shape, range, and the like disclosed in the drawings.

One feature of the embodiment described in detail below is that, in order to analyze morphological relations of a plurality of phases, operations are performed in a plurality of images, and persistent homology analysis is performed on the operations.

Embodiment 1

Figure 1:
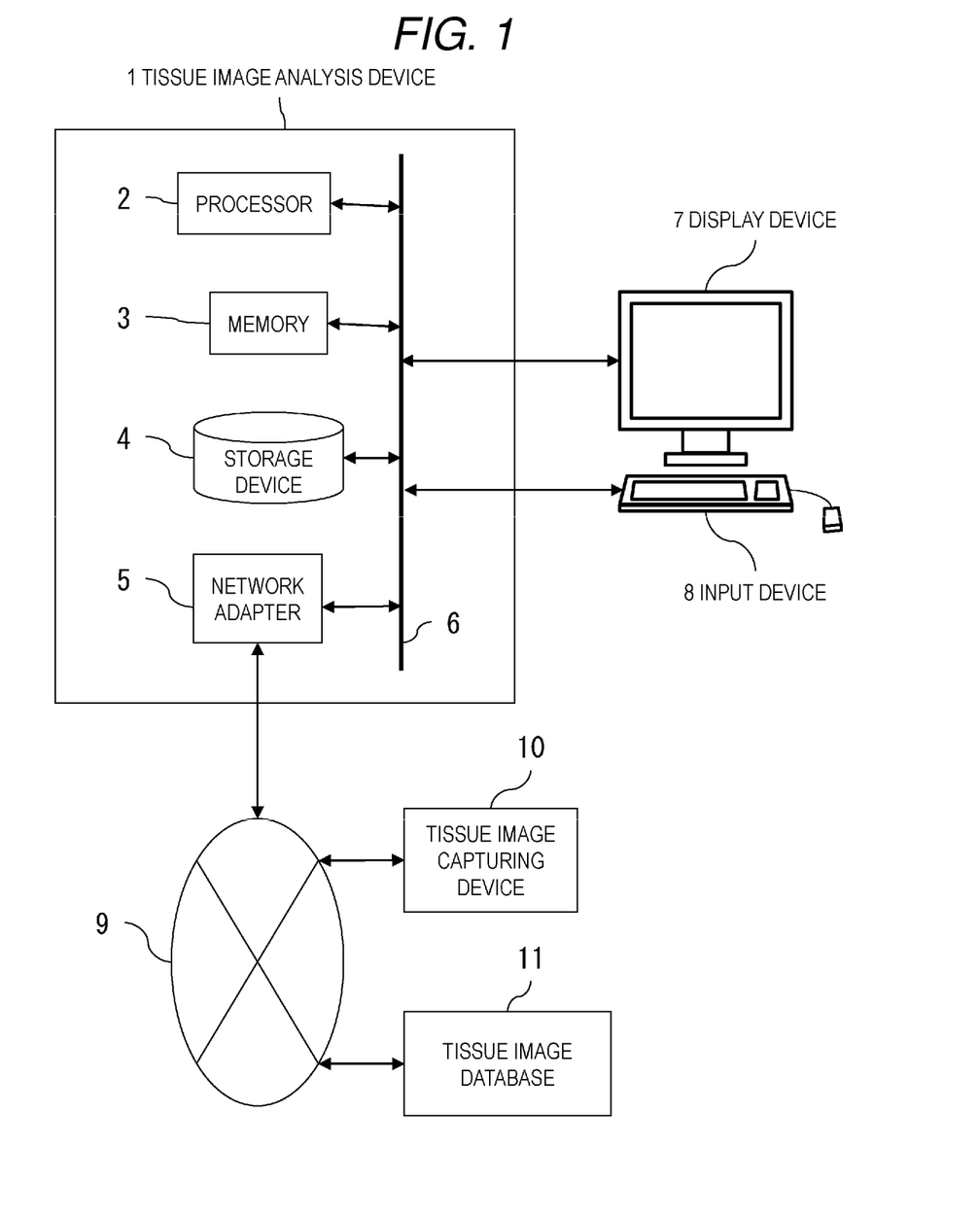
FIG. 1 is an overall configuration diagram of a microstructural image analysis device.

FIG. 1 is a diagram showing a hardware configuration of a microstructural image analysis device 1. The microstructural image analysis device 1 is configured such that a processor 2, a memory 3, a storage device 4, and a network adapter 5 are connected via a system bus 6 so as to be able to transmit and receive signals. Further, the microstructural image analysis device 1 is connected to a microstructural image capturing device 10 and a microstructural image database 11 via a network 9 so as to be able to transmit and receive signals, and is also connected to a display device 7 and an input device 8. Here, "to be able to transmit and receive signals" means a state in which signals can be transmitted and received to and from each other or from one to the other regardless of whether the connections are electrically, optically wired or wireless.

The processor 2 is a device that controls operations of each component and executes a program stored in the storage device 4. The memory 3 stores the program executed by the processor 2 and a progress of operation processing. The storage device 4 is a device that stores the program executed by the processor 2 and data necessary for executing the program, and specifically, is a hard disk drive (HHD), a solid state drive (SSD), or the like. The network adapter 5 is used for connecting the microstructural image analysis device 1 to the network 9 such as a LAN, a telephone line, or the Internet. Various data handled by the processor 2 may be transmitted to and received from the outside of the microstructural image analysis device 1 via the network 9 such as a local area network (LAN).

The display device 7 is a device that displays analysis result or the like of the microstructural image analysis device 1, and specifically, is a liquid crystal display, a touch panel, or the like. The input device 8 is an operation device in which an operator gives an operation instruction to the microstructural image analysis device 1, and specifically, a keyboard and a mouse, a touch panel, or the like. A pointing device such as a trackpad or a trackball may be used instead of the mouse.

The microstructural image capturing device 10 is a device that captures a microstructural image, for example, an optical microscope or a scanning electron microscope. The microstructural image database 11 is a database system that stores microstructural images and the like captured by the microstructural image capturing device 10.

Figure 2:
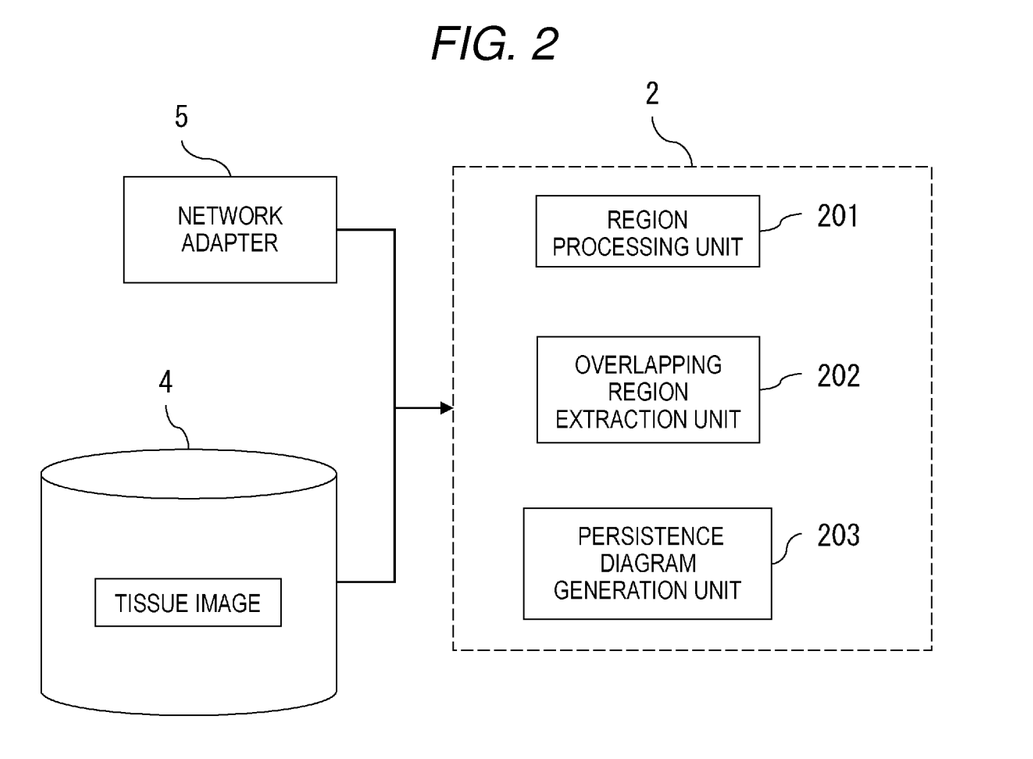
FIG. 2 is a functional block diagram of the microstructural image analysis device.

A functional block diagram of Embodiment 1 will be described with reference to FIG. 2. Each function shown in FIG. 2 may be configured with the dedicated hardware using an application specific integrated circuit (ASIC), a field-programmable gate array (FPGA), or the like, or may be configured with software running on the processor 2. In the following description, a case where each function of Embodiment 1 is configured with software will be described.

Embodiment 1 includes a region processing unit 201, an overlapping region extraction unit 202, and a persistence diagram generation unit 203. Further, the storage device 4 stores a microstructural image or the like captured by the microstructural image capturing device 10. Hereinafter, each unit will be described.

The region processing unit 201 extracts a plurality of regions from the microstructural image, and performs various image processing on the extracted regions. The image processing performed on the regions includes binarization processing for generating a binarized image for the regions, expansion processing for expanding the regions, and contraction processing for contracting the regions.

The overlapping region extraction unit 202 extracts an overlapping region, which is a region in which a plurality of regions overlaps. For example, by executing an AND operation between different binarized images, an overlapping region of the two binarized images is extracted.

The persistence diagram generation unit 203 generates a persistence diagram based on a hole region created and eliminated due to the overlapping region. Details of the persistence diagram will be described later with reference to FIGS. 5A and 5B.

Figure 3:
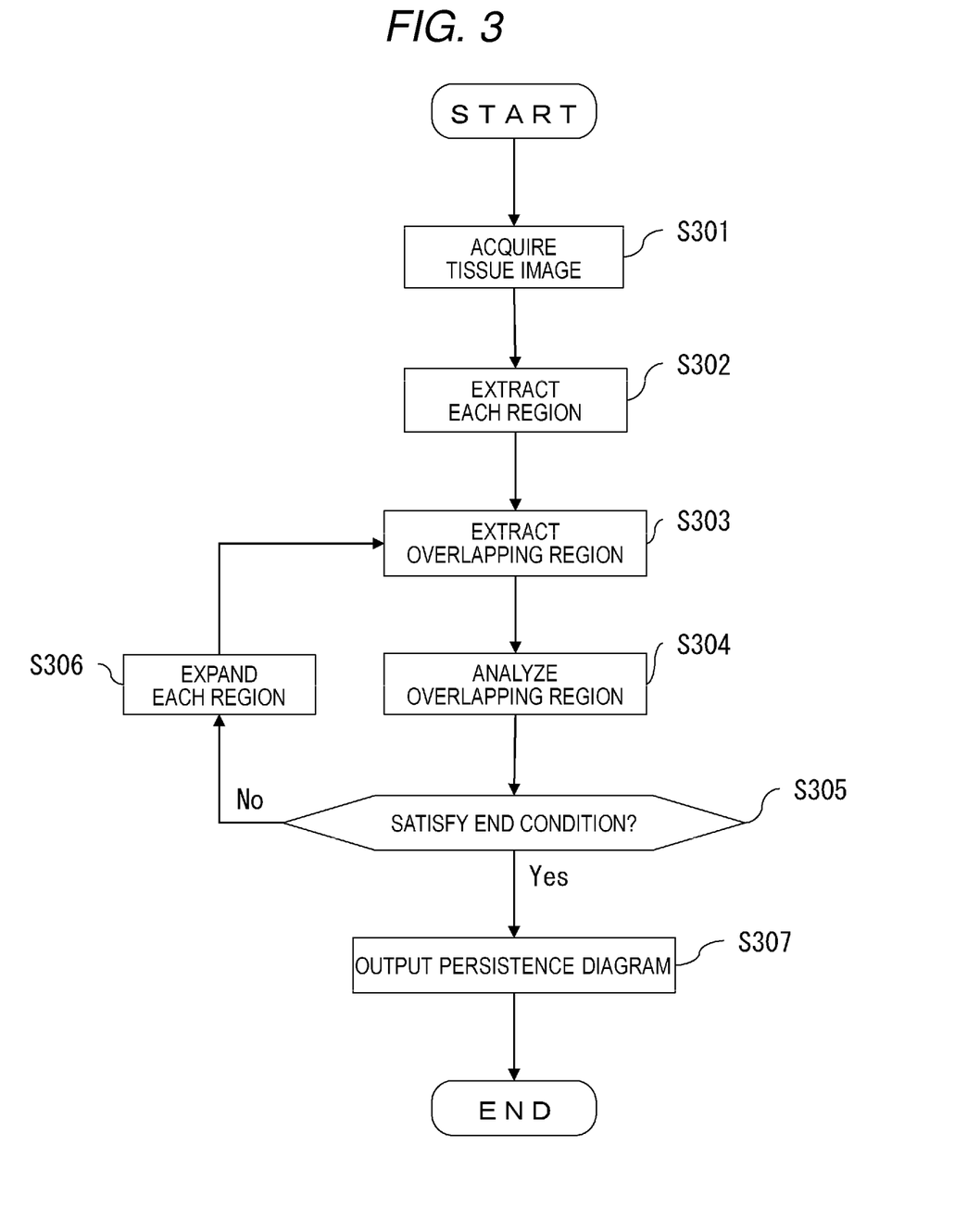
FIG. 3 is a diagram showing an example of a processing flow of Embodiment 1.

An example of a processing flow according to Embodiment 1 will be described step by step with reference to FIG. 3.

(S301)

The region processing unit 201 acquires a microstructural image by reading the microstructural image from the storage device 4 or receiving the microstructural image from the outside of the microstructural image analysis device 1 via the network adapter 5. The microstructural image may be any of a grayscale image acquired by an electron microscope, a color format image acquired by an optical microscope, a multi-channel image acquired by a multispectral camera, and the like.

(S302)

The region processing unit 201 extracts a plurality of regions from the microstructural image and generates the binarized image based on the extracted regions. The extracted regions are, for example, regions of each phase included in an electron microscope image of an alloy, which is the microstructural image. Any method is used to extract each of the regions, for example, each of the regions may be extracted based on a brightness value and colors of the microstructural image, or each of the regions may be extracted by a machine learning model using data such as textures in the microstructural image.

The generated binarized image is a black-and-white image in which the brightness value of the extracted regions is converted to 1 and the brightness value of the regions other than the extracted regions is converted to 0. A binarized image in which black and white are inverted may be generated.

The plurality of regions is extracted from the microstructural image in S302, and therefore a plurality of binarized images are generated. For example, when the first region, which is the region of a first phase, and the second region, which is the region of a second phase, included in the microstructural image are extracted, a binarized image in which the first region is white and the region other than the first region is black is generated as a first image, and a binarized image in which the second region is white and the region other than the second region is black is generated as a second image. The first row of FIG. 4 exemplifies the images generated by S302.

(S303)

The overlapping region extraction unit 202 extracts the overlapping regions, which are regions in which a plurality of regions overlaps. For example, a region, which has the brightness value of 1 in an image obtained by an AND operation between the first image having the brightness value of 1 in the first region and the second image having the brightness value of 1 in the second region, is extracted as the overlapping region.

Figure 4:
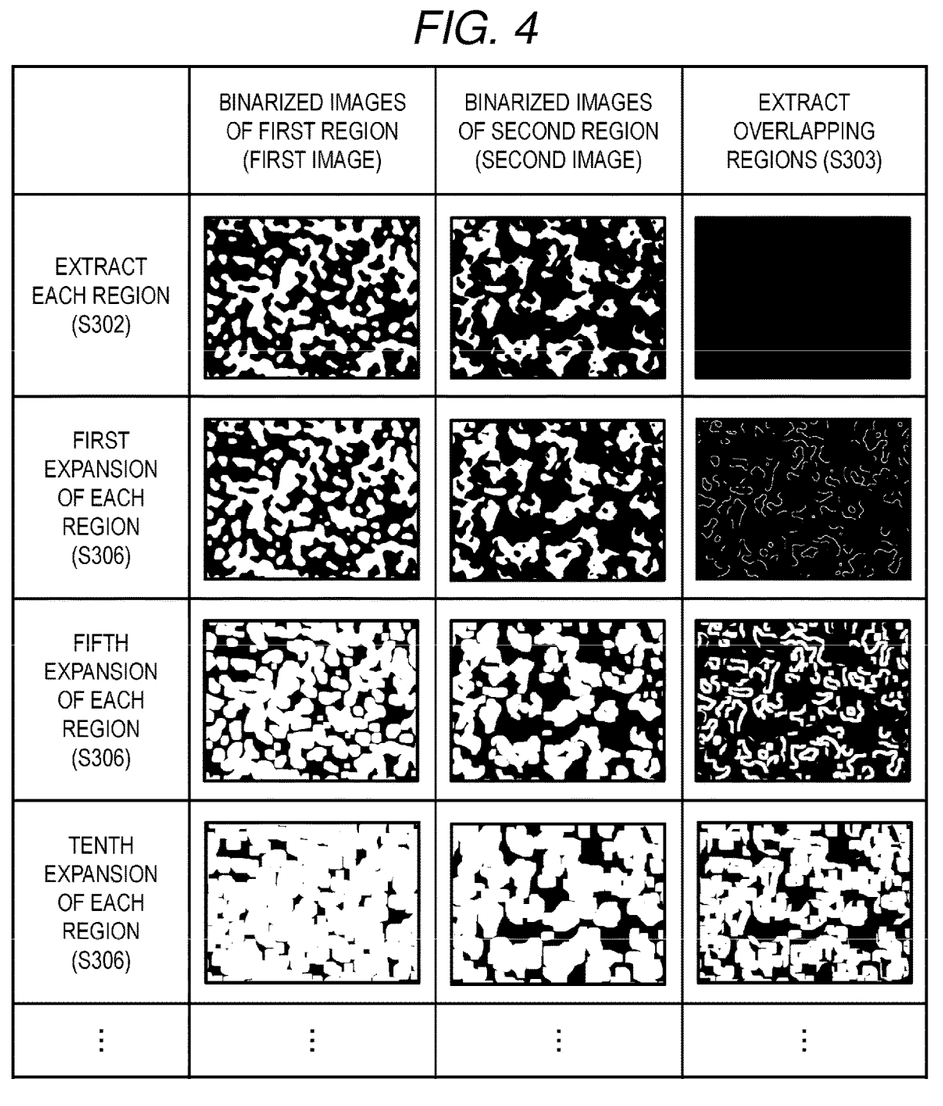
FIG. 4 is a supplementary explanation diagram of extraction processing and expansion processing of each region.

The first phase and the second phase, which are included in the microstructural image, are different phases, and therefore, no overlapping region is extracted between the first image and the second image generated in S302, and as exemplified in the rightmost column of the first row of FIG. 4, an image is output in which the brightness value of all the pixels is 0, that is, the entire image is black. However, the overlapping region is extracted by applying the expansion processing of S306, which will be described later, to each of the regions. Further, the overlapping region becomes larger each time the expansion processing is repeated.

(S304)

The persistence diagram generation unit 203 performs persistent homology analysis on the overlapping region extracted by S303. Specifically, points relating to a hole region are plotted on the persistence diagram based on the hole region created and eliminated due to the overlapping region.

The hole region is an opening portion surrounded by a predetermined region, and the region surrounding the opening portion is an outer edge of the hole region. That is, a closed space formed by the region, which is the outer edge, is the hole region, and an open space having a cut in a part of the region is not the hole region. Further, as the region becomes larger, the hole region is generated when the open space becoming a closed space, and the hole region disappears when the opening portion which is the closed space is filled.

The persistence diagram is a two-dimensional coordinate system in which the horizontal axis is a timing when the hole region is generated in the process of the predetermined region becoming larger, and the vertical axis is a timing when the generated hole region is eliminated. By going through the process from generation to elimination of one hole region, a point relating to the hole region is plotted on the persistence diagram. In S304, points relating to the hole region created and eliminated in the process of the overlapping region becoming larger are plotted on the persistence diagram.

The persistent homology analysis in S304 may be performed while treating the overlapping region as a hole region. That is, points relating to the hole region are plotted on the persistence diagram based on the generation and the elimination of the overlapping region treated as the hole region. The overlapping region may be generated by overlapping the regions, or by fusing the isolated overlapping regions in the process of expanding the regions. The elimination of the overlapping region is achieved by the fusion of the isolated overlapping regions. That is, the fusion of the isolated overlapping regions is performed by eliminating each of the overlapping regions before fusion while generating a new overlapping region.

(S305)

Whether an end condition is satisfied is determined. For example, it is determined that the end condition is satisfied when the regions have been expanded to cover the entire image by repeating the expansion processing of S306. When the end condition is satisfied, the processing proceeds to S307, and when the end condition is not satisfied, the processing is returned to S303 via S306.

The end condition may include setting an upper limit of the number of repetitions of the expansion processing, setting a threshold value for the ratio at which the overlapping region becomes larger, and the like. When it is determined that the end condition is satisfied when the number of repetitions of the expansion processing reaches the upper limit, analysis can be performed in a fixed time regardless of the type of the microstructural image. Further, when it is determined that the end condition is satisfied when the ratio at which the overlapping region becomes larger reaches the threshold value, the time required for the analysis can be shortened depending on the type of the microstructural image.

(S306)

The region processing unit 201 expands each of the regions. For example, the first region and the second region are expanded by converting the brightness values of the pixels around the first region and the second region from 0 to 1. The expanded first region and the expanded second region are updated as a new first region and a new second region.

An expansion amount, that is, the number of pixels from the outer periphery of each of the regions, which are the targets of converting the brightness value, is preset according to the emphasized items. For example, when the analysis accuracy is emphasized, one pixel is set as the expansion amount, and when an analysis speed is emphasized, a plurality of pixels are set as the expansion amount.

The second to fourth rows of FIG. 4 exemplify the first images and the second images which are updated in S306 together with the an image in which the overlapping regions are extracted in S303, that is, the image obtained by performing the AND operation on the updated first image and the updated second image. The second row shows the image after a first expansion processing, the third row shows the image after a fifth expansion processing, and the fourth row shows the image after a tenth expansion processing. As shown in FIG. 4, as the number of repetitions of the expansion processing for the first region and the second region increases, the overlapping region, which is the white portion, becomes larger.

(S307)

The persistence diagram generation unit 203 outputs the persistence diagram. That is, each time the expansion of the regions in S306 and the extraction of the overlapping region in S303 are repeated, a persistence diagram in which points related to the hole region are plotted in S304 is output.

Figure 5A:
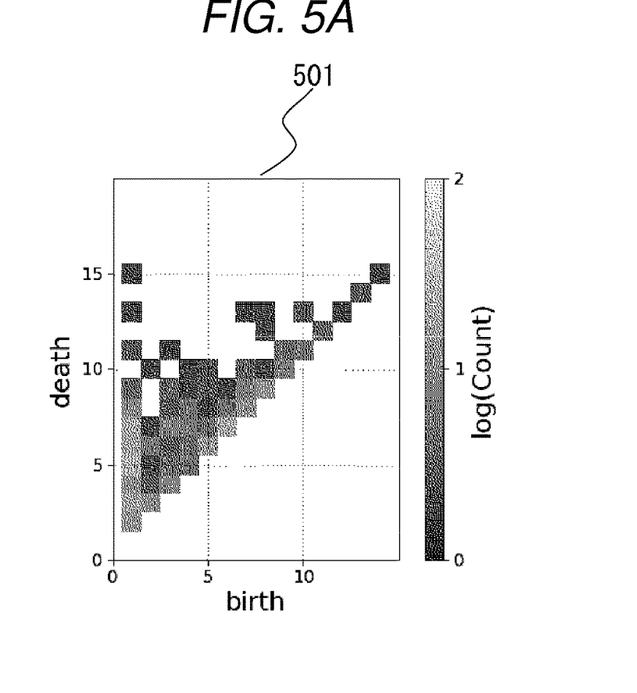
FIG. 5A is a diagram showing an example of a persistence diagram of Embodiment 1.

By the processing flow described above, a persistence diagram is output in which the relation in a plurality of regions included in the microstructural image is quantified. FIG. 5A is an example of the persistence diagram, in which a horizontal axis represents birth, which is the number of repetitions of the expansion processing when the hole region is generated, and a vertical axis represents death, which is the number of repetitions of the expansion processing when the hole region is eliminated. In FIG. 5A, the number of hole region plotted at the same coordinates is shown in shades.

Figure 5B:
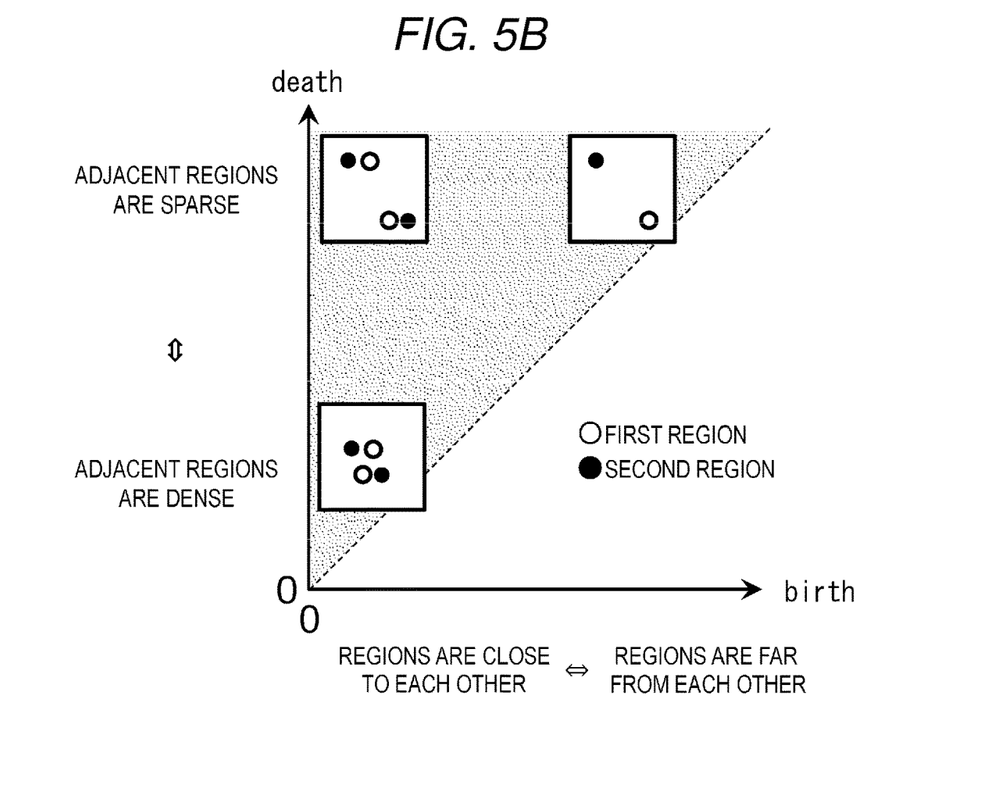
FIG. 5B is a diagram illustrating the persistence diagram of Embodiment 1.

The information obtained from the persistence diagram output in Embodiment 1 will be described with reference to FIG. 5B. In the persistence diagram of Embodiment 1, the points relating to the hole region generated and eliminated due to the overlapping region that becomes larger as the regions are expanded are plotted, and therefore, the value of birth on the horizontal axis changes according to the distance between the regions. That is, if the distance between the first region and the second region is short, the value of birth becomes smaller, and if the distance is long, the value of birth becomes larger. Further, the value of death on the vertical axis changes according to the density of adjacent regions, if the adjacent regions are denser, the value of death becomes smaller, and if the adjacent regions are sparser, the value of death becomes larger.

That is, from the distribution of the points plotted on the persistence diagram of Embodiment 1, information relating to the distance in the plurality of regions and the density of adjacent regions included in the microstructural image can be obtained. Among the points close to the line in which birth=death, the point closest to the origin represents the shortest distance between the regions. Further, the number of points plotted at each coordinate may be weighted. For example, when weighting is performed based on the distance from the line in which birth=death in a direction of the death axis, an index regarding an area of each of the regions is calculated.

Figure 6:
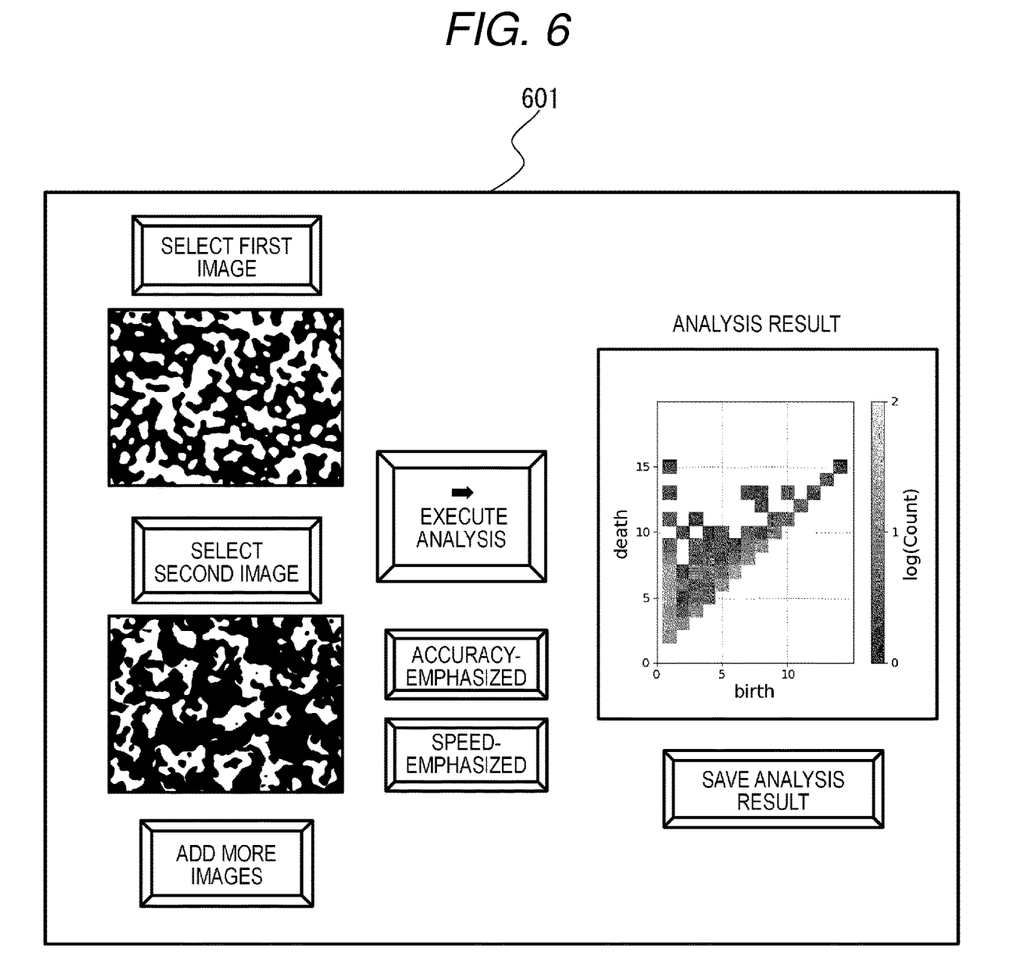
FIG. 6 is a diagram showing an example of an input/output screen of Embodiment 1.

An example of an input/output screen used in Embodiment 1 will be described with reference to FIG. 6. In an input/output screen 601, the first image and the second image, which are two binarized images generated based on the plurality of regions extracted from the microstructural image, are selected as the input images. A third or more images may be added as the input images by clicking a button labeled "ADD MORE IMAGES". When an "EXECUTE ANALYSIS" button is clicked after the input image is selected, the analysis is executed and the persistence diagram is displayed as the analysis result. The persistence diagram is saved by clicking a "SAVE ANALYSIS RESULT" button. The expansion amount may be set by clicking either an "ACCURACY-EMPHASIZED" or "SPEED-EMPHASIZED" button before the "Execute Analysis" button is clicked. The input/output screen 601 in FIG. 6 is an example, and the input/output screen may be such that the microstructural image transmitted from the microstructural image capturing device 10 such as an optical microscope is used as the input image, or the persistence diagram which is the analysis result is transmitted to another analysis device.

As described above, according to Embodiment 1, since the persistence diagram is output in which the points relating to the hole region generated and eliminated due to the overlapping region extracted each time the regions included in the microstructural image are expanded are plotted, it is possible to quantitatively indicate the relations between the plurality of regions. In addition, the persistence diagram may be incorporated into machine learning or the like, and may be used for optimization of a manufacturing method or performance.

Embodiment 2

Embodiment 1 mainly describes the analysis of the hole regions generated and eliminated due to the overlapping regions of two regions included in the microstructural image. The microstructural image may include three or more regions. Therefore, Embodiment 2 describes the analysis of the hole regions generated and eliminated due to the overlapping regions of three or more regions. The difference from Embodiment 1 is the number of regions included in the microstructural image, and therefore this point will be mainly described. Since the hardware configuration and the functional block diagram of the microstructural image analysis device 1 are the same as those in Embodiment 1, the description is omitted, and the processing flow is similar to that in Embodiment 1, so that the description is simplified.

Figure 7:
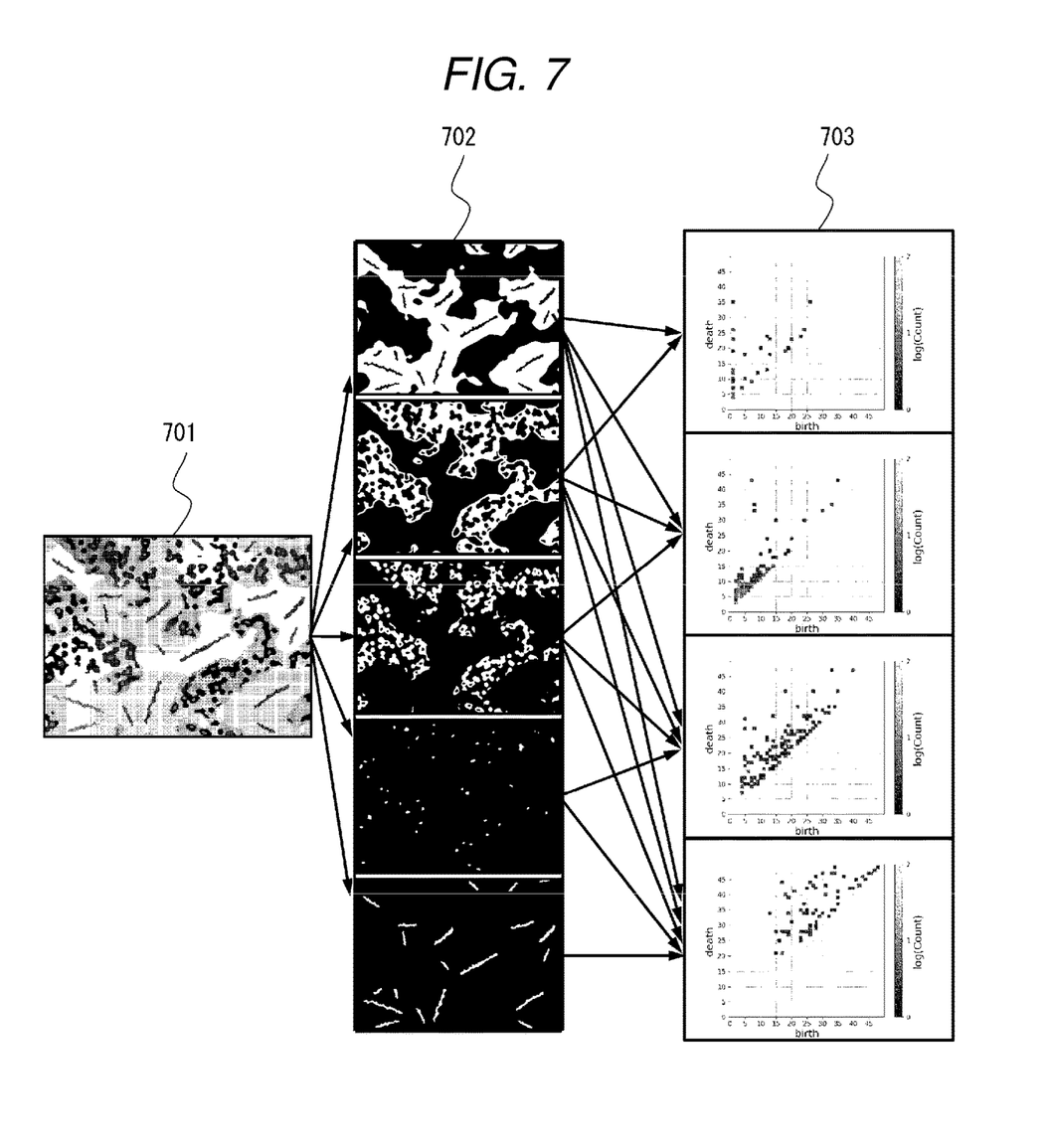
FIG. 7 is a supplementary explanation diagram of Embodiment 2.

Embodiment 2 will be described with reference to FIG. 7. FIG. 7 exemplifies binarized images 702 of five phases that are extracted from the microstructural image 701 and four persistence diagrams 703 which are results of combining and analyzing the binarized images of each of the phases. Further, in the four persistence diagrams 703, a first diagram from the top is a persistence diagram output as a result of combining and analyzing two phases, a second diagram is a persistence diagram output as a result of combining and analyzing three phases, a third diagram is a persistence diagram output as a result of combining and analyzing four phases, and a fourth diagram is a persistence diagram output as a result of combining and analyzing five phases. The combination of the binarized images of each of the phases may be any combinations as long as the combination does not include the same phase.

As exemplified in FIG. 7, even though the microstructural image includes three or more regions, it is possible to generate a persistence diagram by appropriately combining the binarized images generated by extracting the regions and analyzing the hole regions generated and eliminated due to the overlapping regions. In the generated persistence diagram, the distance between the regions and the density of adjacent regions are displayed as a distribution of points.

As described above, according to Embodiment 2, even though the microstructural image includes three or more regions, the persistence diagram is output in which the points relating to the hole region generated and eliminated due to the overlapping region extracted each time the regions included in the microstructural image are expanded are plotted. As a result, it is possible to quantitatively indicate the relations between not only two regions but also three or more regions.

Embodiment 3

Embodiments 1 and 2 mainly describe the analysis of the hole regions generated and eliminated due to the overlapping regions of the plurality of regions included in microstructural images of single visual field. The sample in which the microstructural image is captured has variations for each part, and observation in a plurality of fields of view multiple may be required. However, how to integrate information obtained in the plurality of fields of view is a technical problem. Therefore, in Embodiment 3, the integration of the information obtained from the microstructural images captured in the plurality of fields of view will be described. The difference from Embodiments 1 and 2 is the number of microstructural images captured in different visual fields, and this point will be mainly described. Since the hardware configuration and the functional block diagram of the microstructural image analysis device 1 are the same as those in Embodiment 1, the description is omitted, and the processing flow is similar to that in Embodiment 1, so that the description is simplified.

Figure 8:
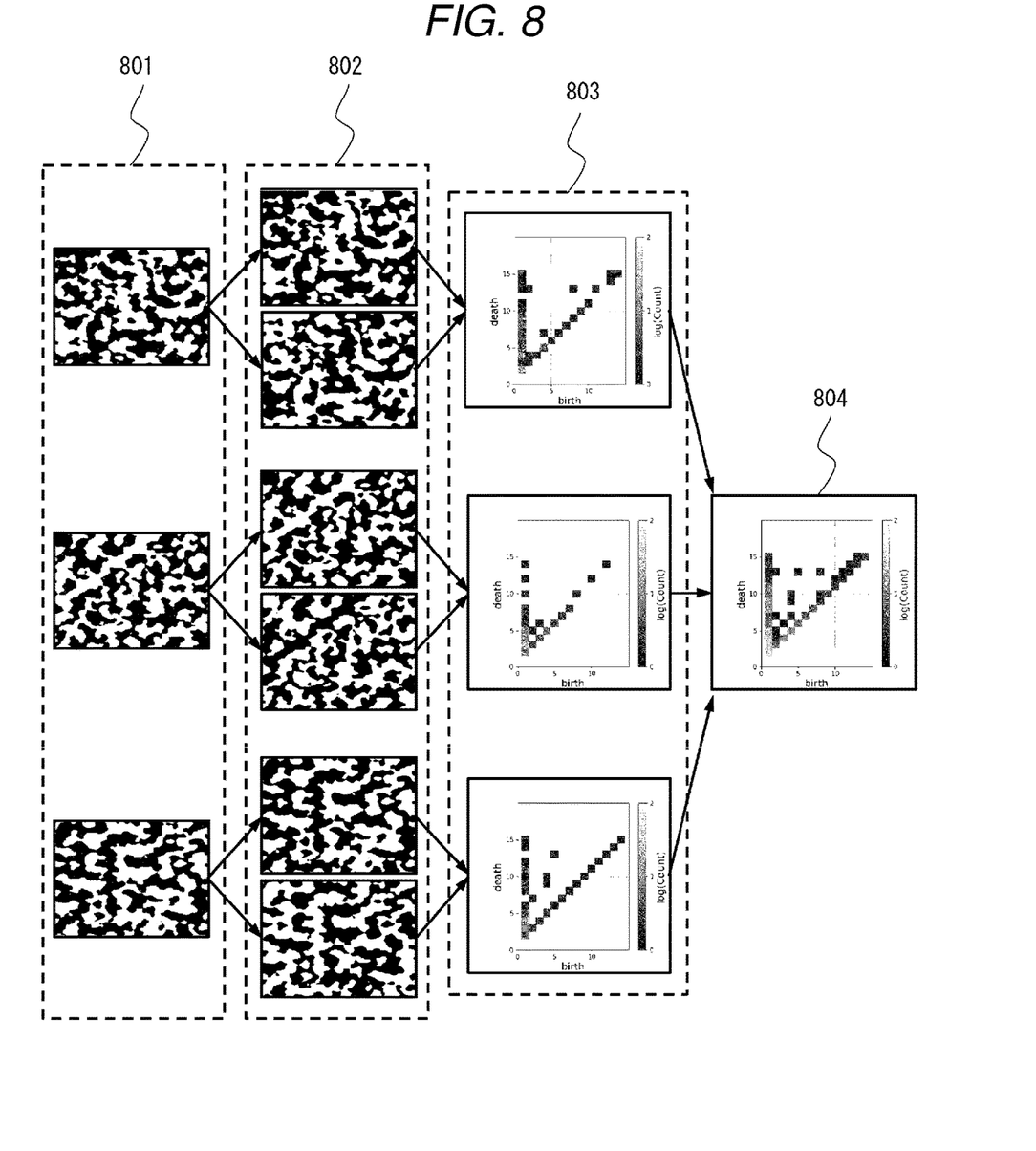
FIG. 8 is a supplementary explanation diagram of Embodiment 3.

Embodiment 3 will be described with reference to FIG. 8. FIG. 8 exemplifies three microstructural images 801 captured in different visual fields, binarized images 802 for each phase extracted from each microstructural image 801, three persistence diagrams 803 which are the results of analyzing the binarized image 802 for each phase in each visual field, and an integrated persistence diagram 804 that integrates the persistence diagrams 803. From each microstructural image 801 captured in different visual fields, a binarized image 802 for each of the two phases is generated, and a persistence diagram 803 is generated for each visual field. Further, the integrated persistence diagram 804 is generated by overlapping the three persistence diagrams 803.

The integrated persistence diagram 804 exemplified in FIG. 8 presents information with reduced variations in each site of the sample, which allows an operator to obtain more reliable analysis results. Further, by displaying the persistence diagram 803 for each different visual field, the operator can grasp the size of the variations in each visual field.

As described above, according to Embodiment 3, the persistence diagram relating to each of the microstructural images captured in the plurality of fields of view is generated, and the integrated persistence diagram is generated in which the persistence diagrams are integrated. As a result, it becomes possible to quantify the relation between regions in each of the plurality of visual fields and to grasp the information in which persistence diagrams are integrated.

The three embodiments of the microstructural image analysis device and the microstructural image analysis method of the invention have been described above. The microstructural image analysis device and the microstructural image analysis method of the invention are not limited to the above embodiments, and components may be modified and embodied without departing from the spirit of the invention. For example, a persistence diagram may be generated according to the hole regions generated and eliminated due to the overlapping regions of the first region and the second region extracted every time the regions other than the first region and the second region in the microstructural image are contracted. Moreover, a plurality of components disclosed in the embodiments can be combined as appropriate. Further, some components may be deleted from all the components shown in the embodiments.

What is claimed is:

1. A microstructural image analysis device for analyzing a microstructural image, the device comprising:
 a processor and a memory that stores instructions that when executed by the processor configure the processor to:
 extract a first region and a second region from the microstructural image;
 expand the first region and the second region in an expansion processing by converting values of one or more pixels around the first region and the second region to different values;
 extract an overlapping region of both the first region and the second region each time the first region and the second region are expanded; and
 generate a persistence diagram, which is a two-dimensional coordinate system, based on a hole region generated and eliminated due to the overlapping region increasing each time the first region and the second region are expanded, the coordinate system having a horizontal axis indicating a number of repetitions of the expansion processing when a hole region is generated, and a vertical axis indicating a number of repetitions of the expansion processing when the hole region is eliminated.

2. The microstructural image analysis device according to claim 1,
 wherein the processor is further configured to repeat the expansion processing of the first region and the second region until an end condition is satisfied.

3. The microstructural image analysis device according to claim 2,
 wherein the end condition is that the first region and the second region cover the entire image.

4. The microstructural image analysis device according to claim 2,
 wherein the end condition is an upper limit of the number of repetitions of expansion of the first region and the second region.

5. The microstructural image analysis device according to claim 2,
 wherein the end condition is a threshold value for a ratio at which the overlapping region becomes larger.

6. The microstructural image analysis device according to claim 1,
 wherein the processor is further configured to set expansion amounts of the first region and the second region according to an emphasized item, the expansion amounts being a number of pixels having their values converted in the expansion processing.

7. The microstructural image analysis device according to claim 1,
 wherein the processor is further configured to:
 analyze a plurality of microstructural images and extract the first region and the second region from each of the plurality of microstructural images, and
 generate persistence diagrams for the plurality of microstructural images, and an integrated persistence diagram by integrating the persistence diagrams.

8. A microstructural image analysis method for analyzing a microstructural image, the method comprising:
 a region processing step of extracting a first region and a second region from the microstructural image;
 expanding the first region and the second region in an expansion processing by converting values of one or more pixels around the first region and the second region to different values;
 an overlapping region extraction step of extracting an overlapping region of both the first region and the second region each time the first region and the second region are expanded; and
 a persistence diagram generation step of generating a persistence diagram, which is a two-dimensional coordinate system, based on a hole region generated and eliminated due to the overlapping region increasing each time the first region and the second region are expanded, the coordinate system having a horizontal axis indicating a number of repetitions of the expansion processing when a hole region is generated, and a vertical axis indicating a number of repetitions of the expansion processing when the hole region is eliminated.

* * * * *